United States Patent [19]

Tomoe et al.

[11] Patent Number: 5,701,601
[45] Date of Patent: Dec. 23, 1997

[54] RECEIVE SIGNAL LEVEL DETECTION SYSTEM

[75] Inventors: Naohito Tomoe; Takashi Kashiwagi, both of Amagasaki, Japan

[73] Assignee: Mitsubishi Denki Kabushiki Kaisha, Tokyo, Japan

[21] Appl. No.: 445,508

[22] Filed: May 22, 1995

[30] Foreign Application Priority Data

Jun. 1, 1994 [JP] Japan ..................... 6-119834

[51] Int. Cl.$^6$ .................................. H04B 17/00
[52] U.S. Cl. ...................... 455/226.2; 455/226.4
[58] Field of Search .............. 455/200.1, 226.2, 455/250.1, 303, 304, 314, 315, 226.4; 370/110.4

[56] References Cited

U.S. PATENT DOCUMENTS

| | | | |
|---|---|---|---|
| 318,434 | 12/1885 | Arai | 455/226.2 |
| 4,131,761 | 12/1978 | Giusto | 370/110.4 |
| 4,776,040 | 10/1988 | Ichikawa et al. | 455/315 |
| 4,939,788 | 7/1990 | Hasegawa | 455/250.1 |
| 5,108,334 | 4/1992 | Eschenback et al. | 455/314 |

FOREIGN PATENT DOCUMENTS

| | | |
|---|---|---|
| 0639901 | 2/1995 | European Pat. Off. . |
| 4369485 | 12/1992 | Japan . |
| 2178270 | 2/1987 | United Kingdom . |

*Primary Examiner*—Nguyen Vo
*Attorney, Agent, or Firm*—Rothwell, Figg, Ernst & Kurz

[57] ABSTRACT

A superheterodyne receiver is provided in which first and second envelope detectors having a function of regulating the gain and offset voltage are used to detect receive signal levels from first and second intermediate frequency signals. These receive signal levels are compensated with respect to a phase difference through a phase difference compensating circuit. The compensated signals are then summed by an adder to provide a receive signal level detection output.

5 Claims, 5 Drawing Sheets

1

RECEIVE SIGNAL LEVEL DETECTION SYSTEM

BACKGROUND OF THE INVENTION

1. Field of the Invention

The present invention relates to improvements of a receive signal level detection system applicable to a superheterodyne receiver.

2. Description of the Related Art

FIG. 8 shows a receive signal detection system according to the prior art. In FIG. 8, a radio frequency signal received by an antenn 101 is converted into an intermediate frequency signal in a receiver 502. The intermediate frequency signal is then detected by an envelope detector 503.

The envelope detector 503 can ascertain the amplitude of the converted intermediate frequency signal received thereby, resulting in detection of the receive signal level.

The receive signal detection system of the related art has such a receive signal input level to level detection output characteristic as shown in FIG. 9. In this figure, the abscissa axis shows receive signal input levels while the ordinate axis represents receive signal level detection outputs. As shown, the output level increases proportional to increase of the input level when the receive signal input level is equal to or lower than a predetermined value. Therefore, such a linear region can be used to detect a receive signal level corresponding to each of the receive signal input levels. Thus, the state of the radio channel can be judged.

In the receive signal detection system of the related art, however, the input/output characteristic of the envelope detector 503, that is, the receive signal input level at which the linearity of the receive signal input level to receive signal level detection output characteristic can be maintained is restricted.

As shown in FIG. 9, the output level will be saturated if the receive signal input level exceeds the predetermined value, instead of increasing in proportion to increase of the input level.

As the receive signal input level increases, the non-linearity region (saturated region) of the input/output characteristic in the envelope detector 503 may be used to detect the receive signal level. As a result, the detection of receive signal level can not be properly carried out, resulting in increase of errors.

SUMMARY OF THE INVENTION

It is therefore an object of the present invention to provide a receive signal detection system which can properly detect a receive signal input level even in the saturated region of the related art, resulting in enlargement of a region to be detected.

To this end, the present invention provides a receive signal detection system suitable for use in a superheterodyne receiver, comprising first detection means for detecting a first receive signal level through a high or intermediate frequency amplifier amplifying a radio or intermediate frequency signal and for outputting a signal level having a linear receive signal input level to level detection output characteristic when the receive signal input level exceeds a predetermined value, second detection means for detecting a second receive signal level through a limiter amplifier amplifying an intermediate frequency signal converted from said radio or intermediate frequency signal and for outputting a signal level having a linear receive signal input level to level detection output characteristic when the receive signal input level is equal to or lower than the predetermined value, and combining means for combining the first and second receive signal levels to generate a receive signal level detection output.

In one aspect of the present invention, the combining means comprises means for compensating a phase difference between the first and second receive signal levels at a point in time, and means for summing the first and second receive signal levels compensated with respect to the phase difference.

In another aspect of the present invention, each of said first and second detection means include a function of regulating the detection output so that a receive signal input level to level detection output characteristic obtained by combining the outputs of the first and second detection means has a smooth linearity.

In still another aspect of the present invention, said means for compensating the phase difference includes a delay line.

In a further aspect of the present invention, the combining means is in the form of a CPU for performing the phase difference compensation and addition.

In such an arrangement, if the receive signal input level is so high that the input/output characteristic of the second envelope detection means will be saturated, the detection of the receive signal level can be made over an increased range to be detected through the linear input/output characteristic of the first envelope detection means.

Since the combining means has means for compensating the phase difference, the addition can be carried out without a phase difference between the first and second receive signal levels.

Since each of the first and second detection means include the function of regulating the detection outputs, the receive signal input level to detection output characteristic obtained by combining the outputs of the first and second detection means can have a smooth linearity.

DETAILED DESCRIPTION OF THE PREFERRED EMBODIMENTS

Some preferred embodiments of the present invention will be described with reference to the drawings.

First Embodiment

Figure 1:
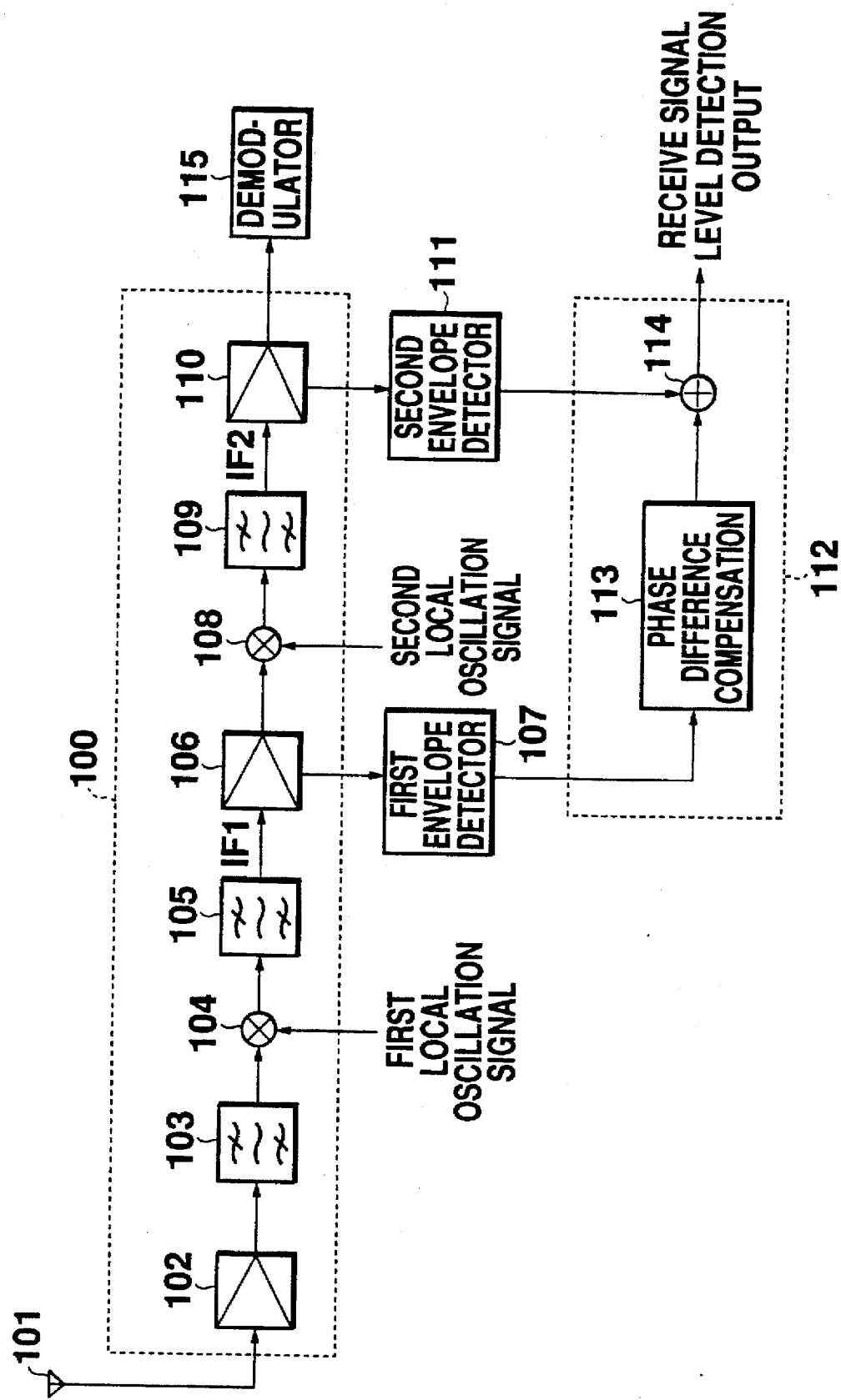
FIG. 1 is a block diagram of one embodiment of an receive signal detection system constructed in accordance with the present invention.

FIG. 1 shows the first embodiment of a receive signal detection system constructed according to the present invention.

A double superheterodyne receiver 100 shown in FIG. 1 comprises an antenna 101, a high frequency amplifier 102 for amplifying a signal received by the antenna 101 and a band-pass filter 103 for limiting the band. The receiver 100 also comprises a mixer 104 and another band-pass filter 105 which generate a first intermediate frequency signal (IF1) that is in turn amplified by an intermediate frequency amplifier 106. The output of the intermediate frequency amplifier 106 is inputted into the first envelope detector 107 and the mixer 108. The output of the mixer 108 is then inputted into a band-pass filter 109 which in turn outputs a second intermediate frequency signal (IF2). The second intermediate frequency signal is amplified by a limiter amplifier 110 and then inputted into a second envelope detector 111 and a demodulating unit 115.

The gain of the intermediate frequency amplifier 106 is set to be relatively low. Thus, the output of the intermediate frequency amplifier 106 is very weak and does not clearly exhibit linearity with a low receive signal input level. However, the output thereof will exhibit remarkable linearity as the receive signal input level increases. When the output of the intermediate frequency amplifier 106 is detected by a first envelope detector 107 and if the receive signal input level is relatively high, the receive signal input level to detection output characteristic will have linearity.

Figure 2:
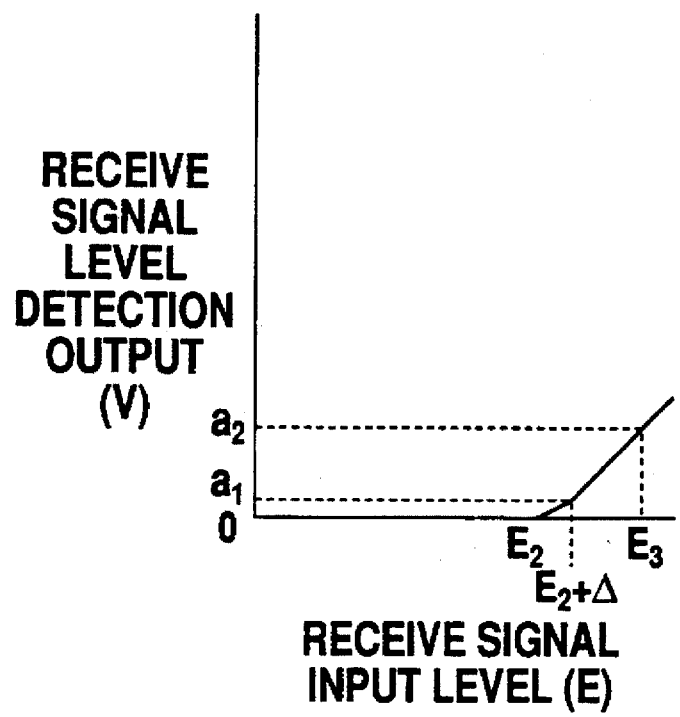
FIG. 2 is a graph illustrating a receive signal input level to detection output characteristic in the first intermediate frequency signal of the receive signal detection system according to the present invention.

A receive signal input level to level detection output characteristic or input/output characteristic in the first intermediate frequency signal of the first envelope detector 107 is shown in FIG. 2. As shown in FIG. 2, the input/output characteristic will have linearity when the receive signal input level exceeds a predetermined value $E_2+\Delta$.

The first envelope detector 107 has a function of regulating the gain and offset voltage, that is, the gradient of the straight line and the movement thereof in the direction of the ordinate axis which shows the input/output characteristic of FIG. 2. Thus, the first envelope detector 107 forms the first detection means of the present invention.

On the other hand, the gain of the limiter amplifier 110 is set to be higher than that of the intermediate frequency amplifier 106. The output level of the limiter amplifier 110 may be saturated by the higher receive signal input level. Thus, the output of the second envelope detector 111 for detecting the output signal of the limiter amplifier 110 may also be saturated by the higher receive signal input level.

Figure 3:
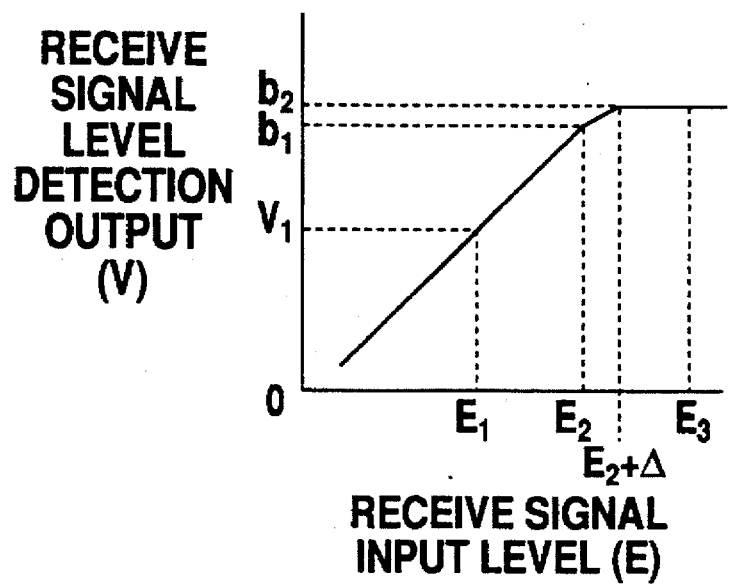
FIG. 3 is a graph illustrating a receive signal input level to detection output characteristic in the second intermediate frequency signal of the receive signal detection system according to the present invention.

An input/output characteristic in the second intermediate frequency signal of the second envelope detector 111 is shown in FIG. 3. As shown, the input/output characteristic has linearity until the receive signal input level reaches the predetermined value $E_2$. However, the linearity will be degraded when the receive signal input level exceeds the value $E_2$. The output level of the second envelope detector 111 will be saturated when the receive signal input level exceeds $E_2+\Delta$.

The second envelope detector 111 also has a function of regulating the gain and offset voltage and forms the second detection means of the present invention.

As shown in FIGS. 2 and 3, the receive signal level detection output corresponding to the first intermediate frequency signal has linearity if the receive signal input level is higher than $E_2+\Delta$. The receive signal level detection output corresponding to the second intermediate frequency signal also has linearity when the receive signal input level is lower than $E_2$. Therefore, this embodiment uses a detection level combining circuit 112 to combine these detection levels such that the receive signal level detection characteristic will have linearity over a widened receive signal level range. The detection level combining circuit 112 forms the combining means of the present invention.

There is a phase difference between the outputs of the first and second envelope detectors 107, 111. The detection level combining circuit 112 comprises a phase difference compensating circuit 113 which compensates such a phase difference before the detection outputs are summed by an adder 114. Thus, the detection outputs can be summed without any phase difference therebetween.

When the detection outputs are summed by the adder 114, the gain and offset voltage regulating function in the first and second envelope detector 107, 111 can regulate the gain and offset voltage. Therefore, the gradient of the straight lines showing the receive signal level detection characteristic (those of FIGS. 2 and 3) as well as the positions thereof in the direction of the ordinate axis can be regulated. Thus, the combined receive signal level detection characteristic can be a smooth straight line.

Figure 4:
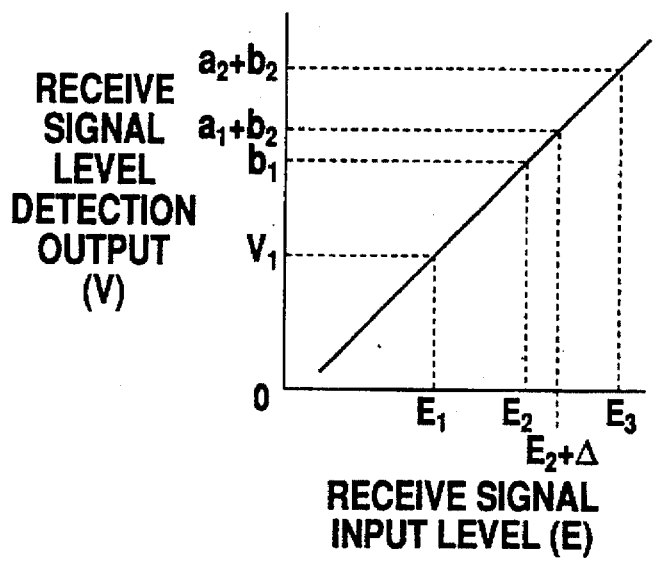
FIG. 4 is a graph illustrating a receive signal input level to detection output characteristic obtained by combining the graphs of FIGS. 2 and 3.

FIG. 4 shows a receive signal input level to detection output characteristic thus obtained. As will be apparent from FIG. 4, the receive signal level detection output characteristic has linearity over an increased receive signal input level range.

As described, this embodiment can properly detect the receive signal level by combining the detection output levels of the first and second envelope detectors even if the receive signal input level is so high that the receive signal level detection will be saturated as in the related art. Therefore, a receive signal detection system can be provided which can detect the receive signal level over an increased range.

Second Embodiment

Figure 5:
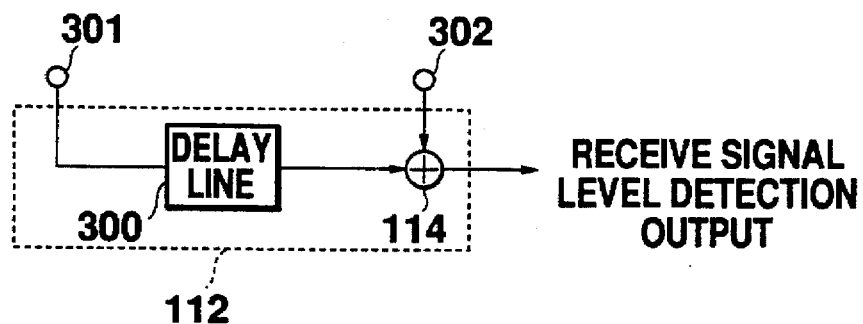
FIG. 5 is a block diagram of the second embodiment of a receive signal detection system constructed in accordance with the present invention.

Referring to FIG. 5, there is shown the second embodiment of the present invention which uses a delay line 300 in place of the phase difference compensating circuit 113 in the detection level combining circuit 112 described with respect to the first embodiment.

The detection level combining circuit 112 comprises terminals 301 and 302 which are respectively connected to the first and second envelope detectors 107, 111 as described with respect to the first embodiment. As described in the first embodiment, there is a phase difference between the detection outputs from the terminals 301 and 302. In the second embodiment, thus, the delay line 300 delays the phase of the detection output from the first envelope detector 107 by a given period to match the phases of the detection outputs from the first and second envelope detectors with each other.

In such a manner, the phase difference between the detection outputs can be compensated before they are summed by the adder 114.

Third Embodiment

Figure 6:
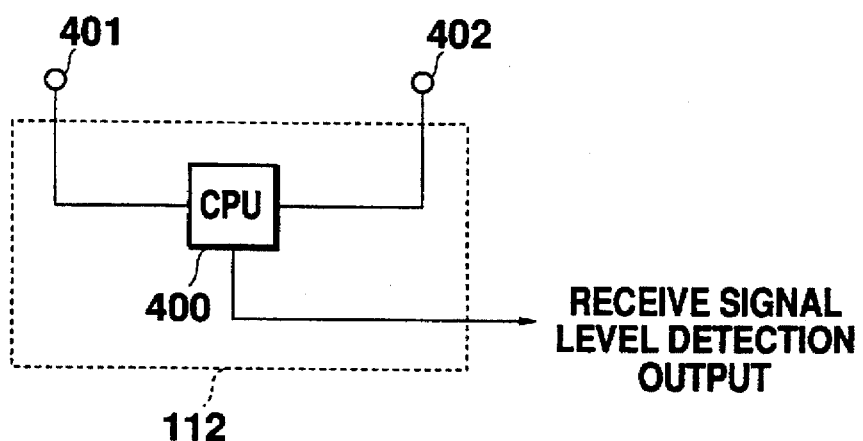
FIG. 6 is a block diagram of the third embodiment of a receive signal detection system constructed in accordance with the present invention.

Referring next to FIG. 6, there is shown the third embodiment of the present invention which comprises a central processing unit (CPU) 400 for performing the functions of the phase difference compensating circuit 113 and adder 114 in the detection level combining circuit 112.

The detection level combining circuit 112 comprises terminals 401 and 402 which are respectively connected to the first and second envelope detectors 107, 111, as in the second embodiment.

CPU 400 converts the detection outputs into binary numbers which are in turn subjected to the phase difference compensation and addition.

Figure 7:
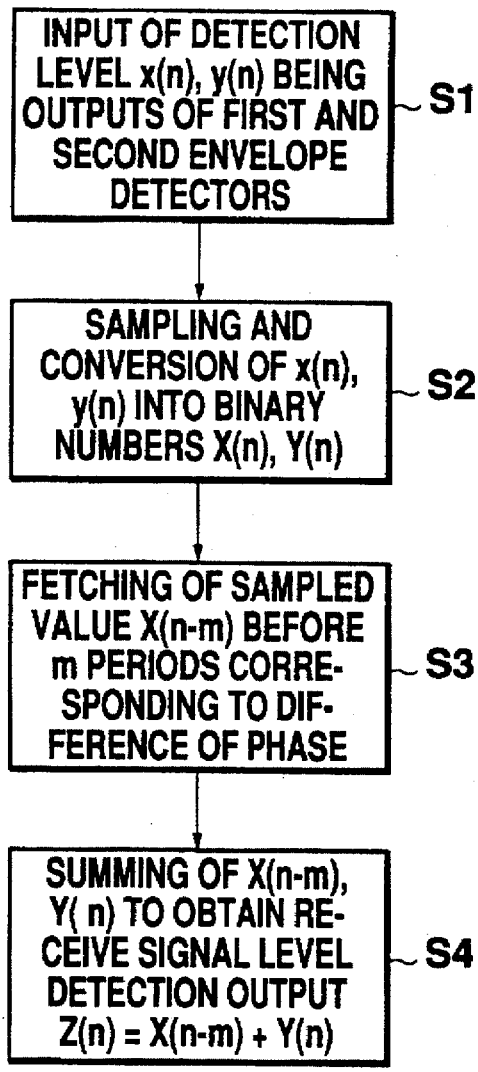
FIG. 7 is a flow chart illustrating an operation in the detection level combining circuit of the third embodiment.
Figure 8:
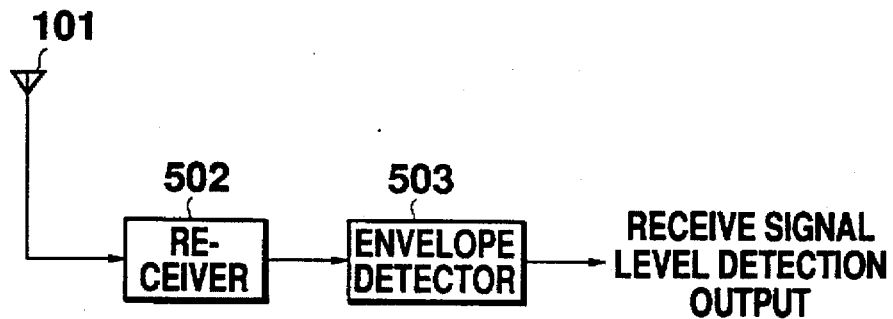
FIG. 8 is a block diagram of a receive signal detection system constructed in accordance with the related art.
Figure 9:
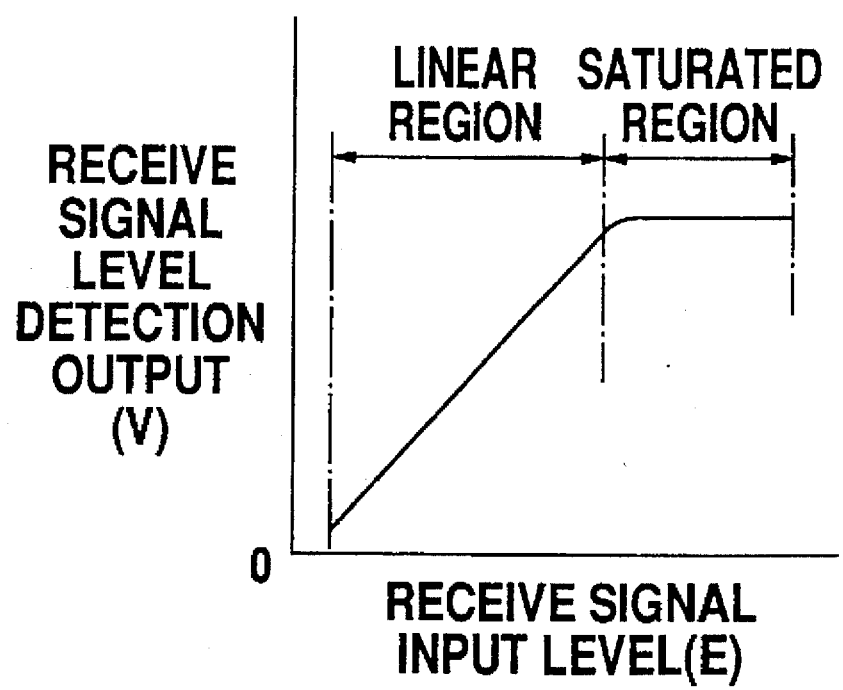
FIG. 9 illustrates a receive signal input level to detection output characteristic in the receive signal detection system of the related art.

Such an operation is shown in the flow chart of FIG. 7.

In FIG. 7, detection levels x(n) and y(n), which are the detection outputs of the first and second envelope detectors 107, 111, are inputted into the detection level combining circuit 112 through the terminals 401 and 402. The alphabet n represents the period of the detection level (S1).

The detection levels x(n) and y(n) are then sampled and converted into binary numbers X(n) and Y(n) by an A/D converter (not shown), these binary numbers being then stored in a memory (S2).

Subsequently, a sampled value X(n−m) before m periods corresponding to the difference of phase between the detection levels x(n) and y(n) is fetched from the memory with respect to X(n) corresponding to the output of the first envelope detector 107. X(n−m) and Y(n) are binary numbers corresponding to the detection levels of the same phase (S3).

Finally, these binary numbers X(n−m) and Y(n) are summed to provide a binary number Z(n) corresponding to the receive signal level detection output. Namely, Z(n)=X(n−m)+Y(n). Such a binary number Z(n) is used to judge the receive signal level (S4).

According to the third embodiment, the phase difference compensation and addition of the detection outputs can be carried out using software through the CPU 400. This can simplify the circuit structure.

We claim:

1. A receive signal detection system suitable for use in a superheterodyne receiver, comprising:

first detection means for detecting a first receive signal level through a high or intermediate frequency amplifier amplifying a radio or intermediate frequency signal at a first intermediate frequency and for outputting a signal level having a linear receive signal input level to level detection output characteristic when the receive signal input level exceeds a predetermined value;

second detection means for detecting a second receive signal level through a limiter amplifier amplifying an intermediate frequency signal converted from said radio and for outputting a signal level having a linear receive signal input level to level detection output characteristic when the receive signal input level is equal to or lower than the predetermined value; and means for combining the first and second receive signal levels to generate a receive signal level detection output having a linear detection characteristic in either of an input level in which the detection characteristic of the first receive signal level has linearity or another input level in which the detection characteristic of the second receive signal level has linearity.

2. A receive signal detection system as defined in claim 1 wherein said combining means comprises means for compensating a phase difference between the first and second receive signal levels at a point in time, and a detection level combining circuit which comprises means for summing the first and second receive signal levels compensated with respect to the phase difference.

3. A receive signal detection system as defined in claim 2 wherein said means for compensating the phase difference includes a delay line.

4. A receive signal detection system as defined in claim 2 wherein the combining means is in the form of CPU for performing the phase difference compensation and addition.

5. A receive signal detection system as defined in claim 1 wherein each of said first and second detection means include a function of regulating the detection output so that a receive signal input level to level detection output characteristic obtained by combining the outputs of the first and second detection means has a smooth linearity.

* * * * *

UNITED STATES PATENT AND TRADEMARK OFFICE
CERTIFICATE OF CORRECTION

PATENT NO. : 5,701,601
DATED : December 23, 1997
INVENTOR(S) : Naohito Tomoe et al.

It is certified that error appears in the above-identified patent and that said Letters Patent is hereby corrected as shown below:

In the Claims: Col. 6, line 4 (claim 1), after "radio" insert -- or intermediate frequency signal at a second intermediate frequency different from said first intermediate frequency --.

Signed and Sealed this

Eighth Day of June, 1999

Attest:

Q. TODD DICKINSON

*Attesting Officer*     Acting Commissioner of Patents and Trademarks